2,765,160

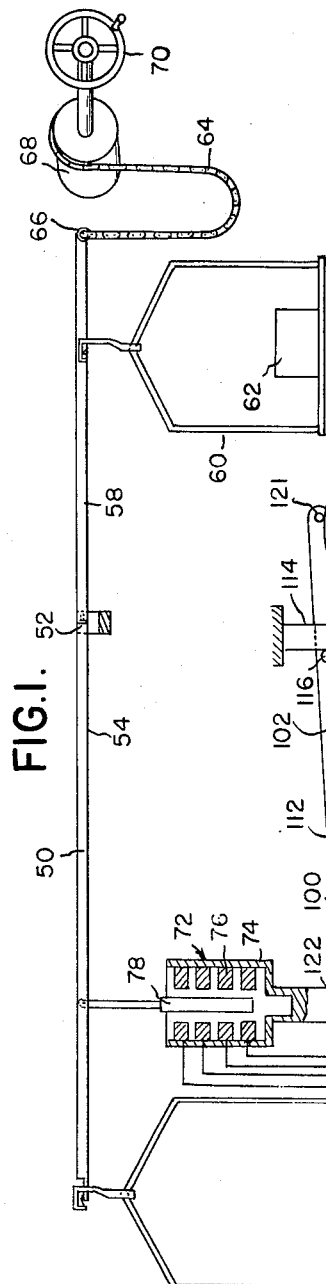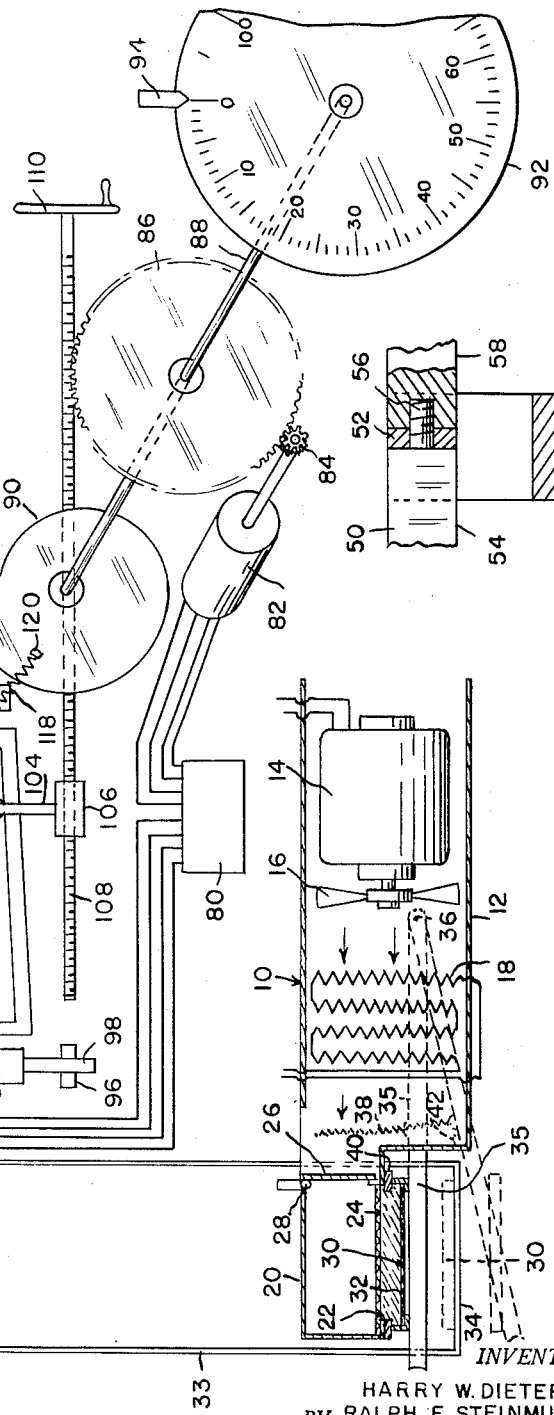
INVENTORS
HARRY W. DIETERT
BY RALPH E. STEINMUELLER
ATTORNEYS United States Patent Office 2,765,160
Patented Oct. 2, 1956

QUICK MOISTURE TELLER

Harry W. Dietert and Ralph E. Steinmueller, Detroit, Mich., assignors to Harry W. Dietert Company, Detroit, Mich., a corporation of Michigan Application August 25, 1952, Serial No. 306,162

13 Claims. (Cl. 265—29)

The present invention relates to weighing apparatus, and more particularly to weighing apparatus particularly designed to afford a direct reading of percentage moisture by weighing a catch weight of a sample first in moist and then in dry condition. The weighing apparatus may if desired be used for direct weighing but it has been specifically modified as disclosed herein to render it adaptable for the purpose of giving a direct reading of percentage by weight of moisture.

It is an object of the present invention to provide apparatus of the character described adapted to weigh a moist sample, flash dry the sample, weigh the dry sample, and give a direct reading of the original percentage by weight of moisture of the sample.

It is a further object of the present invention to provide weighing apparatus including a pair of relatively movable parts, one of which is movable with a balance scale, and the other of which is mounted on a lever adapted to be rotated by a cam to restore the parts to neutral position. In the preferred form of the invention the two parts are the armature and winding parts of a differential transformer and produce an output of electrical current which is utilized to drive a motor to rotate a cam to restore the parts to neutral position.

It is a further object of the present invention to provide apparatus comprising a balance arm, a lever, a cam associated with the lever, control mechanism including a pair of relatively movable parts one of which is carried by the balance arm and one of which is carried by the lever, and means for rotating the cam to move the lever to restore the parts to neutral position when the balance arm is moved.

It is a further object of the present invention to provide apparatus of the character described in the preceding paragraph in which the pair of parts are the winding part and armature part of a differential transformer, and the means includes a motor actuated by the output of the differential transformer to rotate the cam in the proper direction and in the proper amount to restore the parts to neutral position.

It is a further object of the present invention to provide in apparatus of the character described in the preceding paragraph an adjustable pivot means for the lever whereby the apparatus may be employed to determine percentage by weight of moisture of samples by shifting the pivot means in accordance with the catch weight of the sample carried by the balance arm.

Other objects and features of the invention will become apparent as the description proceeds, especially when taken in conjunction with the accompanying drawings, wherein:

Figure 1 is a diagrammatic view, partly in section illustrating the complete apparatus.

Figure 2 is an enlarged sectional view illustrating the manner of connecting the balance arm to a supporting steel tape.

While the apparatus is capable of other uses, it was particularly designed for the purpose of giving a quick and direct reading of original percentage by weight of moisture in a sample. For this purpose the apparatus includes flash drying mechanism indicated generally at 10 including a housing 12 in which is mounted an electric motor 14 connected to a blower 16 and suitable heating means 18 such for example as electrical heating elements. Other forms of heating and blowing air for the purpose of drying a sample may of course be employed. The housing 12 includes an extension 20 having a downwardly directed opening 22 closed by a screen 24 and controlled by a damper 26 pivoted as indicated at 28. Associated with the flash dryer 10 is a sample pan 30 having an open bottom closed by a filter screen 32. The sample pan is adapted to contain moist sand or other material which it is desired to test for percentage by weight of moisture. Weighing mechanism, later to be described, includes a stirrup 33 having a cross connector 34 at the bottom adapted to support the sample pan 30 in weighing position. Associated with the housing 12 is a lever 35 pivoted as indicated at 36 and urged upwardly by a spring 38. The lever 35 includes a portion adapted to underlie the sample pan 30 and to raise it from the dotted line position in which it is supported on the cross member 34 to the elevated position shown in full lines in which the upper edge of the pan 30 rests against a ring 40 surrounding the air outlet opening 22. The lever 35 is movable downwardly to the dotted line position where it may be pressed laterally into engagement with a catch 42 and thus retained out of contact with the pan 30. It will of course be apparent that with the lever in the lowermost dotted line position the sample pan and sample therein is supported by the stirrup 33 and its weight is therefore effective on the weighing mechanism. However, when the lever is released from the catch 42 it raises the sample pan into closing engagement with the air outlet opening so that air discharged therethrough is forced to pass through the sample when the damper 26 is raised. It is found in practice that a sample may be dried in this manner in a very few seconds.

The weighing mechanism comprises a balance arm indicated generally at 50 which is pivoted intermediate its ends. In a preferred form of the invention the pivot support for the balance arm 50 may comprise a steel band or tape 52, as best seen in Figure 2, in which case the balance arm 50 may be made up of two parts, a part 54 having a threaded stud 56 extending from one end and passing through an opening in the steel band or tape 52, and a second part 58 having a tapped recess at one end to thread onto the stud 56. The steel band or tape acts to oppose uniformly increasing resistance to pivoting movement of the balance arm 50, or in other words, acts as a uniform rate counterbalance spring.

Alternatively, the balance arm 50 may be supported on a knife edge and forces may be developed opposing pivoting movement of the balance arm by conventional means such for example as pendulums as commonly used in conventional weighing scales. Adjacent one end of the balance arm 50 is a support 60 adapted to carry a selected counterweight 62. Preferably, quick adjustable means are provided for varying the effectiveness of the counterbalance on the balance arm and this is illustrated as comprising a chain 64 secured at one end as indicated at 66 to the end of the balance arm and having a portion wound around a drum 68 connected to a hand wheel 70. Obviously, rotation of the hand wheel winds up or releases the chain and thereby varies the effective weight of the chain supported by the balance arm.

Means are provided comprising a pair of relatively movable parts which may be relatively moved in either direction from an intermediate neutral position. Preferably, and as illustrated herein, this means comprises a differential transformer 72 comprising a winding part 74 including windings 76 therein, and an armature or core part 78. Differential transformers of this type are available on the market and are sold under the trade name of "Atcotran" and others. With the armature in centralized or neutral position within the windings the differential transformer has no output. However, upon relative displacement between the armature and winding part of the transformer an output is developed which is variable in magnitude and direction dependent upon the direction and amount of relative displacement. The output of the differential transformer 72 is connected to an amplifier 80 and the amplified output is transmitted to an electric motor 82 which drives a small pinion 84 meshing with a large gear 86 secured to a drive shaft 88. Connected to the drive shaft 88 is a cam 90 which in the present instance is illustrated as a constant rise cam since it is associated with the steel band or tape type of pivot support for the balance arm. However, if a different type of counterbalance is employed the contour of the cam may be varied conformably therewith. Also carried by the shaft 88 is an indicating dial 92 associated with a pointer 94. As illustrated, the dial is graduated from zero to 100 and is arranged to make substantially 360 degrees of rotation to include all of the graduations.

The armature 78 of the differential transformer 72 is connected to the balance arm 50 for movement therewith. The winding part of the differential transformer 72 is mounted for vertical movement in a guide bushing 96 and for this purpose is provided with a downwardly extending stem 98 extending through the bushing. Associated with the winding part 74 of the transformer is a lever 100 which is pivoted intermediate its ends. The pivot means supporting the lever 100 is herein illustrated as a roller 102 carried by a stem 104 connected to a threaded sleeve 106 mounted for horizontal or longitudinal adjustment on a threaded shaft 108 having a hand wheel 110. The lever 100 is constructed to provide an elongated slot 112 in which the roller 102 is movable. A vertical guide post 114 is provided and the lever 100 includes a vertical guide roller 116 engageable with a side surface of the post 114. A tension spring 118 is connected between the lever and a fixed stationary post 120 and urges the roller 116 against the vertical surface of the post 114. The lever 100 is also provided with a cam follower 121 which engages the periphery of the cam 90. At the opposite end the lever 100 includes means 122 engaging the winding portion 74 of the differential transformer so that with the pivot roller 102 in fixed position rotation of the cam 90 will effect vertical movement of the winding portion of the differential transformer. If the weighing apparatus is to be employed for conventional weighing the lever 100 may be mounted on a fixed pivot although if desired the pivot could be adjustable step-by-step to provide different scales. However, in the present case the pivot roller 102 is longitudinally adjustable to permit quick and accurate determination of moisture content of catch weights of moist material such for example as sand.

In order to determine the percentage of moisture by weight of a catch weight sample of sand or other material the lever 35 is brought to the lower dotted line position and the empty sample pan is allowed to rest upon the stirrup 33. At this time the hand wheel 70 will be rotated in the proper direction to cause rotation of the cam 90 and dial 92 to bring the 100 indication on the dial adjacent the pointer 94. This may be considered to be a condition in which all of a sample had been dissipated, or in other words, to represent 100% loss. A moist specimen of material is now placed in the sample pan. The amount of the sample is not critical, or in other words, a catch weight of the sample may be employed. With the catch weight of the sample in the pan resting on the stirrup 33 the hand wheel 110 is now adjusted to shift the pivot mounting 102 in the proper direction to bring the zero indication on the dial opposite the pointer 94. This is to cause correct indication of no loss of moisture from the sample. With the weighing mechanism adjusted as just described, the lever 35 is now released and raises the sample pan and moist sample therein against the underside of the ring 40 and the damper 26 is opened. A hot blast of air is forced through the sample and the sample is dried. Experience has indicated that for the usual sample it is sufficient to permit passage of air through the sample for from 10 to 15 seconds if the sample is sand. Thereafter, the damper is swung to closed position and the lever 35 lowered to permit the sample pan and dried sample to again rest upon the stirrup to a new position and will cause rotation of the cam and dial to rebalance the differential transformer and the parts will come to rest with the dial in a position which will indicate the percentage loss of weight, or in other words, the original percentage by weight of moisture in the sample.

While the apparatus as illustrated and described in the foregoing is highly efficient, certain features of the present invention may be practiced without the complete apparatus illustrated. Thus, it has already been mentioned that the weighing apparatus may be employed as a conventional weighing device, in which case the dial 92 may be graduated in standard weight units. In such case the dial 92 may have a plurality of scales and the pivot 102 may have a corresponding plurality of definitely predetermined positions each of which correspond to one of the scales on the dial. While extremely accurate and desirable results are obtained by using a differential transformer, other types of mechanism might be substituted therefor. Thus, for example, instead of employing the differential transformer the two relatively movable parts carried respectively by the balance arm and the lever could be a single contact spaced between two spaced contacts. Thus, relative movement between the parts in either direction would close one set or the other of the contacts and could actuate the electric motor in the proper direction until the switch parts were disconnected. This however, is less desirable than the differential transformer which produces an output variable both in direction and amount in accordance with direction and amount of displacement.

Alternatively, for some uses it might be satisfactory to provide the two parts carried respectively by the balance arm and lever as merely a pair of pointers which could be matched up by manual rotation of the cam 90.

As previously stated however, the differential transformer is an extremely accurate and sensitive device and results in extreme accuracy in results obtained by the apparatus illustrated in the drawing.

While reference has been made to sand as the moist material whose percentage of moisture is to be determined, the apparatus is of course capable of other uses, and among the materials with which the apparatus may be used are granular, fibrous, soils, clays, sands, drugs, foods, feeds, grain, textiles, paper, chemicals, fertilizers, cements, coal, grogs, and many others may be mentioned.

The drawings and the foregoing specification constitute a description of the improved quick moisture teller in such full, clear, concise and exact terms as to enable any person skilled in the art to practice the invention, the scope of which is indicated by the appended claims.

What we claim as our invention is:

1. Apparatus of the character described comprising a balance arm adapted to support a specimen whose percentage of moisture is to be determined, resilient means on said balance arm tending to hold it in balanced position, follow-up mechanism comprising two relatively movable parts, a motor, and means for driving said motor in a direction determined by the direction of relative displacement between said parts and to stop said motor when said parts are in a neutral position with respect to each other, means mounting one of said parts on said balance arm, a lever carrying the other of said parts, a cam driven by said motor and a cam follower on said lever engaging said cam, said lever having an adjustable fulcrum movable longitudinally of said lever to vary the lever arms of said cam follower and of said other part, and manually operable means for adjusting said fulcrum.

2. Apparatus as defined in claim 1 in which said parts are the winding part and armature part of a differential transformer.

3. Apparatus as defined in claim 1 in which said balance arm is pivoted intermediate its ends.

4. Apparatus as defined in claim 3 in which the pivot support of said balance arm comprises a flat steel band occupying a vertical plane having its ends fixed laterally of said arm and secured to said arm intermediate the ends of said band.

5. Apparatus as defined in claim 1 including an adjustable chain take-up device, and a chain connected to extend between said balance arm and said device with a loop in said chain, said adjustable chain take-up device being operable to vary the amount of chain in said loop and thereby to vary the weight of chain supported by said balance arm.

6. Apparatus of the character described comprising a balance arm pivoted intermediate its ends, resilient means biasing said balance arm to an intermediate position, sample supporting means at one end of said arm, a lever pivoted intermediate its ends adjacent said balance arm, pivot means for said lever adjustable longitudinally thereof, an electric motor, a cam driven by said motor, a cam follower on said lever adjacent one end thereof engaging said cam, and motor control means comprising a pair of parts relatively movable in either direction from a neutral position in which said motor is idle to drive said motor in a direction dependent on the direction of relative displacement between said parts, one of said parts being carried by said balance arm and the other of said parts being carried by said lever.

7. Apparatus as defined in claim 6 in which said motor control means comprises a differential transformer, and the two parts comprise the winding part and armature part thereof.

8. Apparatus as defined in claim 6 in which the pivot means for said lever comprises a roller, said lever having a longitudinally extending slot in which said roller is received and is longitudinally adjustable.

9. Apparatus as defined in claim 6 in which said cam is a constant rise cam, and the means biasing said balance arm to intermediate position is a steel band fixed at its ends and secured to said balance arm intermediate its ends to provide a pivot support for said balance arm.

10. A quick moisture teller comprising a balance arm pivoted intermediate its ends, means connected to said arm effective to apply a restoring force thereto dependent on displacement thereof from a neutral position, sample supporting means at one end of said arm, a lever pivoted intermediate its ends adjacent said balance arm, pivot means for said lever adjustable longitudinally thereof, an electric motor, a cam driven by said motor, a cam follower on said lever adjacent one end thereof engaging said cam, and motor control means comprising a pair of parts relatively movable in either direction from a neutral position in which said motor is idle to drive said motor in a direction dependent on the direction of relative displacement between said parts, one of said parts being carried by said balance arm and the other of said parts being carried by said lever, a graduated scale and a pointer connected to said cam and movable over said scale.

11. Apparatus of the character described comprising a balance arm having an adjustable counterbalance thereon and means connected to said arm effective to apply a restoring force thereto dependent on displacement thereof from a neutral position, means on said arm for supporting a sample, a lever adjacent said arm, pivot means for said lever adjustable longitudinally of said lever, follow-up mechanism comprising a pair of parts relatively movable in either direction from a neutral position, one of said parts being carried by said balance arm and the other being carried by said lever, a cam, a cam follower on said lever engaging said cam, a reversible motor connected to rotate said cam, said pair of parts constituting motor control means operable to drive said motor forwardly or reversely dependent upon the direction of relative displacement between said parts, a scale graduated from zero to 100 to indicate percentage of moisture in a specimen sample, said counterweight being adjustable to balance said arm with said scale set to zero, means for adjusting said pivot means to bring said scale to zero with said parts in neutral position when a moist sample of any catch weight is carried by said balance arm whereby when said sample is dried said scale will read directly the original percentage by weight of moisture in said sample.

12. A quick moisture teller for comparing the weight of a catch-weight sample before and after drying comprising a movable sample support, means connected to said support effective to apply a restoring force thereto dependent upon displacement thereof from an initial position, a pivoted lever adjacent said support, pivot means for said lever adjustable longitudinally thereof, an electric motor, a cam driven by said motor, a cam follower on said lever engaging said cam, and motor control means comprising a pair of elements relatively movable in either direction from a neutral position in which said motor is idle to drive said motor in a direction dependent on the direction of relative displacement between said elements, one of said elements being connected to said support, the other of said elements being connected to said lever.

13. A quick moisture teller for comparing the weight of a catch-weight sample before and after drying comprising a movable sample support, means connected to said support effective to apply a restoring force thereto dependent upon displacement thereof from an initial position, a pivoted lever adjacent said support, pivot means for said lever adjustable longitudinally thereof, an electric motor, a cam driven by said motor, a cam follower on said lever engaging said cam, and motor control means comprising a pair of elements relatively movable in either direction from a neutral position in which said motor is idle to drive said motor in a direction dependent on the direction of relative displacement between said elements, one of said elements being connected to said support, the other of said elements being connected to said lever, and indicating means including a member movable in accordance with movement of said cam.

References Cited in the file of this patent

UNITED STATES PATENTS

| Number | Name | Date |
|---|---|---|
| 299,760 | Du Brul | June 3, 1884 |
| 1,880,574 | Thomas | Oct. 4, 1932 |
| 1,967,424 | Nevitt | July 24, 1934 |
| 1,968,539 | Rydberg | July 31, 1934 |
| 2,046,005 | Sprecker | June 30, 1936 |
| 2,047,765 | Brabender | July 14, 1936 |
| 2,080,168 | Dietert | May 11, 1937 |
| 2,291,150 | Dimick | July 28, 1942 |
| 2,316,627 | Sang | Apr. 13, 1943 |
| 2,317,807 | Ryder | Apr. 27, 1943 |
| 2,357,745 | Kliever | Sept. 5, 1944 |
| 2,358,877 | Parks | Sept. 26, 1944 |
| 2,445,022 | Colman | July 13, 1948 |
| 2,487,310 | Chandler | Nov. 8, 1949 |
| 2,507,498 | Brown | May 16, 1950 |
| 2,527,187 | Haab | Oct. 24, 1950 |
| 2,568,586 | Hunt | Sept. 18, 1951 |
| 2,581,205 | Reilly | Jan. 1, 1952 |
| 2,602,660 | Shannon | July 8, 1952 |
| 2,622,438 | Campbell | Dec. 23, 1952 |
| 2,636,724 | Eacrett | Apr. 28, 1953 |